UNITED STATES PATENT OFFICE.

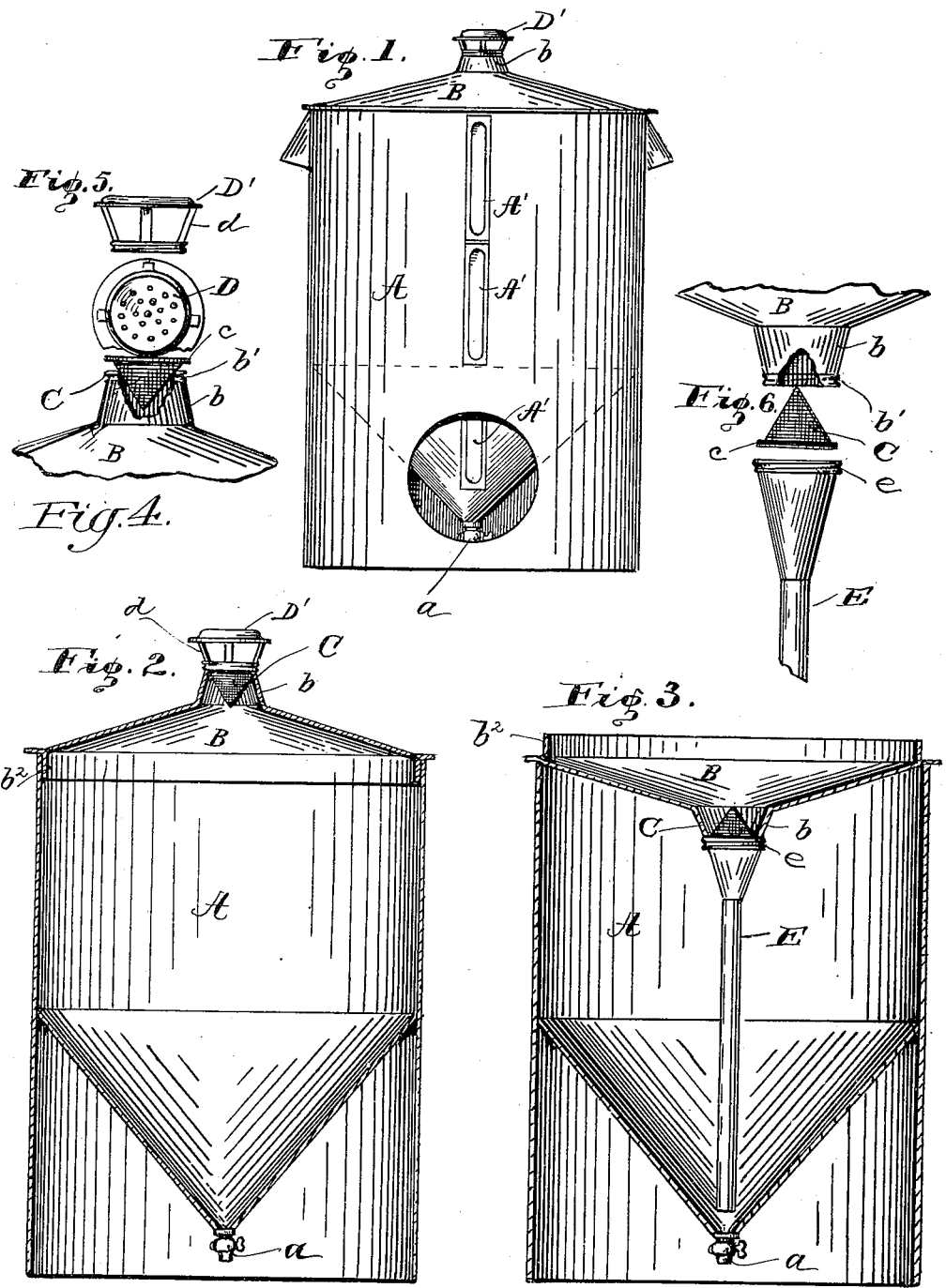

PERRY C. SMITH, OF INDIANAPOLIS, INDIANA, ASSIGNOR, BY DIRECT AND MESNE ASSIGNMENTS, TO MARY E. SMITH, OF SAME PLACE.

MILK AND CREAM SEPARATOR.

SPECIFICATION forming part of Letters Patent No. 659,494, dated October 9, 1900.

Application filed November 1, 1899. Serial No. 735,524. (No model.)

*To all whom it may concern:*

Be it known that I, PERRY C. SMITH, a citizen of the United States, residing at Indianapolis, in the county of Marion and State of Indiana, have invented certain new and useful Improvements in Milk and Cream Separators, of which the following is a specification.

It is known that by the introduction of water into milk the viscosity caused by the casein, sugar, and albumen will be reduced, so that by the addition of about the same quantity of water as there was of milk and the use of a proper separating vessel a more thorough separation of the cream in from thirty to fifty minutes can be had than formerly obtained by letting the milk stand in crocks for as many hours for the cream to rise.

One object of this invention is to provide a separating vessel of right construction to secure the maximum separation in the shortest time, to enable the milk to be drawn off without creating an eddy or vortex, which would mix the cream again with the milk, and to provide a cover with a perforated center, which will admit air and allow the animal heat to escape and which will exclude flies and dirt while the milk is standing for separation and which cover can be turned the other side up and used as a funnel and strainer through which the milk will be strained into the separating vessel.

Another object of my invention is to provide an inexpensive and durable device with removable parts which can be disconnected and separated to permit of easy and thorough cleansing.

I accomplish the objects of the invention by the mechanism illustrated in the accompanying drawings, in which—

Figure 1 is a view in front elevation of my invention; Fig. 2, a vertical central section of the can as shown in Fig. 1; Fig. 3, a like section with the top turned down to be used as a strainer; Fig. 4, a detail of the top of the cover, showing the strainer partly withdrawn and the cap or cover over it tipped back to show its bottom; Fig. 5, a side elevation of the said cap or cover; Fig. 6, a detail of the can-lid, showing the strainer and conductor-tube in disconnected positions.

Like letters of reference indicate like parts throughout the several views of the drawings.

A is the separator body or can, having parallel sides and a right cone-shaped bottom with the vertex downward, which terminates with the faucet $a$, through which the milk and cream are drawn after the separation has been completed.

$A'$ indicates glass gages through which the separation may be seen and the drawing off of the milk and cream timed.

B is the cover of the can, the top of which is preferably cone-shaped, terminating at its apex with the truncated conical dome $b$, the sides of which form more acute angles with its axis than do the sides of the conical cover B. The rim of the dome $b$ is screw-threaded, as shown at $b'$. The cover B has the flange $b^2$ to fit into the can and hold the cover in place.

C is a conical woven-wire strainer with an outwardly-projected flange $c$. The cone C is inserted into the dome $b$ and is suspended therein by the contact with the edge of the dome of the flange $c$. D is a perforated cap (see Fig. 4) having a screw-threaded flange which screws onto the thread $b$ of the dome. The wire strainer excludes flies and small particles of foreign matter. The perforated cap, while admitting air and allowing the animal heat in the can to escape, excludes all bodies larger than the perforations, and to additionally protect the openings a hood $D'$, suitably elevated over the cap by the standards $d$, is used, the cap and hood being united into a one-piece part.

To convert the cover into a strainer and funnel, it is turned the other side up and placed on the top of the can. Beforehand, however, the perforated cap D, with its imperforate hood $D'$, is unscrewed and set aside, and the conical upper end of a conductor-tube E, having the thread $e$, is screwed upon the threaded dome $b$. This is done without removing or changing the wire strainer C. When the inverted cover, with conductor-tube E attached, is placed on the can, the tube is held centrally of the can and extends nearly to the inside vertex of the conical bottom, but leaving, however, room enough around the end of the tube for the free discharge of the milk and water, both of which are added to the can through the said tube E.

The operation of my improved separator is as follows: The faucet being closed, the unstrained milk is poured into the inverted cover, with the conductor-tube attached, as soon as milked from the cow. Then the same amount of pure cold water (ordinary well-water) is added through the same arrangement of inverted cover and conductor-tube. Then the cover and tube are lifted off, the tube unscrewed and cleansed for the next time of use, and the wire strainer cleansed and placed in position again under the perforated cap and hood and the cover placed as such in position on the can. Let the milk and water set for separation, which will be complete in from thirty to fifty minutes, at which time the line between the milk and cream will be very distinct. Then open the faucet and draw off the milk, and when the lower edge of the cream passes below the lower end of the lowest gage close the faucet. The cream can then be drawn off into another vessel. For convenience the can may be set upon a bench with a hole through it, through which the milk and cream will be discharged into a bucket or other vessel placed below the outlet.

A flat strainer might be used instead of a conical one, as shown in the drawings, without departing from the spirit of this invention; but a conical strainer is preferred, because it gives more straining-surface and does not clog up nor allow hairs to pass through.

I am aware of the patents for milk-pail, No. 274,268, and for creaming-can, Nos. 631,218 and 611,275, and do not broadly claim the constructions therein shown; but What I do claim as new, and wish to secure by Letters Patent of the United States, is—

In a milk and cream separator, the combination with a can having parallel sides and a base which is a right cone with a discharge-opening in its apex, of a conical top having an annular flange on its concave side and a truncated conical dome on its convex side with a screw-threaded margin, a strainer located in the dome, said top as described being used interchangeably as a cover to the can or as a funnel and strainer through which the contents of the can will be introduced and strained, and a removable conductor-tube located wholly inside of the can when in use and reaching from the strainer-dome to which it is removably attached, to near the apex of the conical bottom of the can, substantially as described and shown.

In witness whereof I have hereunto set my hand and seal, at Indianapolis, Indiana, this 25th day of October, A. D. 1899.

PERRY C. SMITH. [L. S.]

Witnesses:
JOSEPH A. MINTURN,
AARON D. BAIRD.